March 2, 1965 L. E. PONSY 3,171,995
ROTARY DEVICE FOR COUPLING, WITH SLIP, A VARIABLE SPEED
DRIVING SHAFT TO A DRIVEN SHAFT HAVING
SUBSTANTIALLY CONSTANT SPEED
Filed April 17, 1962 4 Sheets-Sheet 1

INVENTOR
Louis Emile Ponsy
BY
Bailey, Stephens & Huettig
ATTORNEYS

INVENTOR
Louis Emile Ponsy
BY
Bailey, Stephens & Huettig
ATTORNEYS

March 2, 1965 L. E. PONSY 3,171,995
ROTARY DEVICE FOR COUPLING, WITH SLIP, A VARIABLE SPEED
DRIVING SHAFT TO A DRIVEN SHAFT HAVING
SUBSTANTIALLY CONSTANT SPEED
Filed April 17, 1962 4 Sheets-Sheet 3

Fig. 3.

INVENTOR
Louis Emile Ponsy
BY
Bailey, Stephens & Huettig
ATTORNEYS

March 2, 1965 L. E. PONSY 3,171,995
ROTARY DEVICE FOR COUPLING, WITH SLIP, A VARIABLE SPEED
DRIVING SHAFT TO A DRIVEN SHAFT HAVING
SUBSTANTIALLY CONSTANT SPEED
Filed April 17, 1962 4 Sheets-Sheet 4
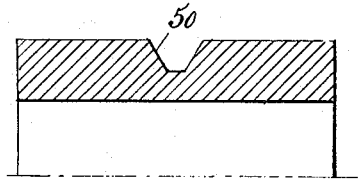
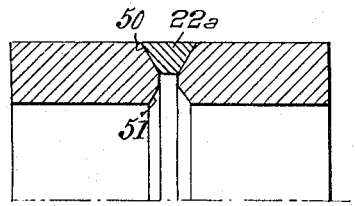
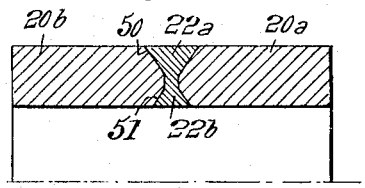
INVENTOR
Louis Emile Ponsy
BY
Bailey, Stephens & Huettig
ATTORNEYS

United States Patent Office 3,171,995
Patented Mar. 2, 1965

3,171,995
ROTARY DEVICE FOR COUPLING, WITH SLIP, A VARIABLE SPEED DRIVING SHAFT TO A DRIVEN SHAFT HAVING SUBSTANTIALLY CONSTANT SPEED
Louis Emile Ponsy, Montmorency, France, assignor to Precision Mecanique Labinal, Saint-Ouen, Seine, France, a society of France
Filed Apr. 17, 1962, Ser. No. 188,049
Claims priority, application France, Nov. 20, 1959, 810,855, Patent 1,249,549
10 Claims. (Cl. 310—95)

The present invention relates to a rotary coupling device comprising an induction clutch, especially of the eddy-current type, adapted to impart to a driven shaft a speed which is substantially constant in spite of considerable variations in the speed of the driving shaft.

A particular application of the invention relates to the association of clutch devices of the kind referred to with an alternator which is required to produce alternating current at a constant frequency, when driven from a shaft the speed of which is subject to variations.

An important field of application of an electric generating set of the above kind is to be found in aviation, in which it may be necessary, on board aircraft for example, to supply radar equipment or other electrical apparatus sensitive to frequency, with an alternating current produced by an alternator which is driven by energy obtained from the propulsion motor, the shaft which drives the alternator through the intermediary of the coupling device according to the invention being, for example, the shaft of a turbine driven by or with the reactor of a jet-propelled aircraft.

The object of the invention is to produce a robust device which operates with accuracy, even under very exacting conditions of working, such as are found for example on board supersonic aircraft.

The invention consists mainly in the provision, between the driving shaft and the induction clutch, of a gear-changing mechanism having at least two different ratios, while at the same time the transmission of the torque in the gear-changing mechanism is effected on the one hand through the intermediary of a free wheel, and on the other hand through the medium of two rotary armatures of a magnetic-powder clutch, the field of which is fixed to the casing of the device and is preferably controlled automatically in dependence on the variable speed of the driving shaft.

The powder clutch is preferably in engagement at the low speeds of the driving shaft, whereas the free wheel is in engagement at the high speeds of the said shaft.

In accordance with a preferred form of embodiment of the invention, the gear-changing mechanism employed has ratios which produce a step-up of the movement between the driving shaft and the output shaft, and the magnetic-powder clutch is mounted at the input of the gear-changing device.

The gear-changing mechanism may advantageously comprise, on the one hand three pinions of different diameters and mounted coaxially with respect to each other and also with the input and output shafts, two of these pinions being adapted to co-act with one of the said shafts through the intermediary of the powder clutch controlled by a member responsive to the speed of rotation of the driving shaft, and through the intermediary of a free-wheel respectively, while the third pinion is keyed on the other of the said shafts, and on the other hand, three further pinions fast for rotation with each other and mounted on a fixed counter-shaft on which they can rotate freely, each of these latter pinions being in engagement with one of the pinions first mentioned.

Another object of this invention is to provide improvements in powder clutches to be used in coupling devices as above referred to, especially in order to prevent soiling of the powder used in the clutch by oil having served to lubricate the bearings of the coupling device.

Further advantageous features of the invention, especially as concerned more particularly with the arrangement of the powder clutch, will be brought out in the description which follows below of a form of embodiment of the invention, reference being made to the accompanying drawings, in which:

FIG. 3 is a view similar to FIG. 2 but showing a different construction of the powder clutch;

FIGS. 4, 5 and 6 are diagrammatical views illustrating three steps of the operation performed on a portion of one of the rotating elements of the clutch of FIG. 3.

Figure 1:
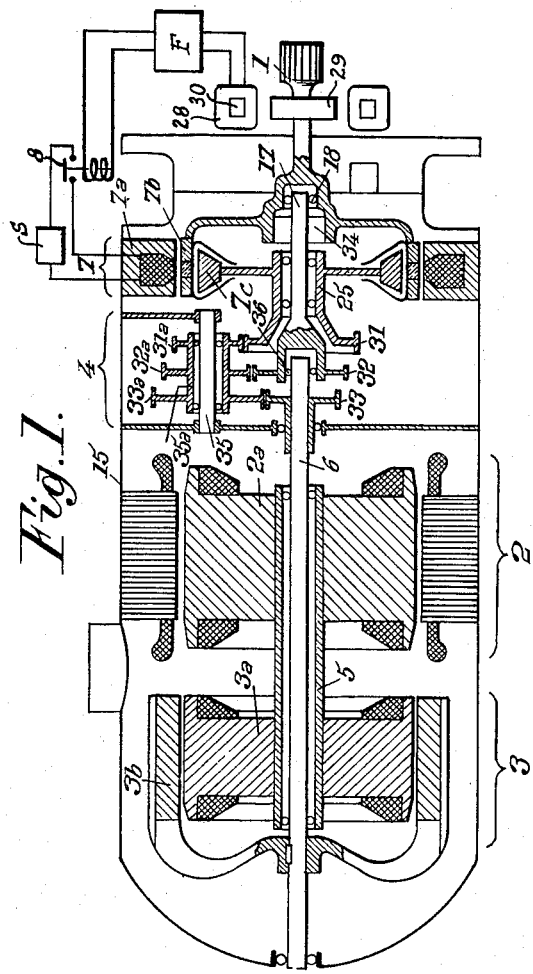
FIG. 1 shows a diagrammatic cross-section of an electric generating unit arranged in accordance with the invention.

Between the variable-speed driving shaft 1 and the rotor 2 of the alternator having a substantially constant speed, there is provided a rotary coupling device comprising an induction clutch 3, in particular of the eddy-current type, and a gear-changing mechanism 4 adapted to transmit the movement of rotation, for example with a step-up ratio, of the driving shaft 1 to the eddy-current clutch, two different step-up gearing ratios being engaged alternatively, depending on the speed of rotation of the driving shaft 1.

The field unit 3a of the eddy-current clutch is preferably mounted with the rotor 2a of the alternator on the same hollow shaft 5 which rotates freely at a substantially constant speed on an intermediate shaft 6 on which is keyed the armature 3b of the eddy current clutch, the shaft 6 being the output shaft of the gear-changing mechanism 4.

In accordance with the principal feature of the invention, the transition from one gear ratio of the mechanism 4 to the other is effected automatically as a function of the speed of the shaft 1 by means of an electro-magnetic powder clutch, the field unit 7a of which is fixed and which, in the case considered of a step-up gear ratio, is preferably mounted on the input side of the gear-changing mechanism.

The excitation current of the fixed field 7a of the clutch is applied or cut-off by a member responsive to the speed of rotation of the driving shaft 1, for example by means of a switch 8 which is operated by centrifugal force, or in an improved form by the means which will be described below.

Although the powder clutch may be constructed in various ways, it is of particular advantage to provide it, in addition to the fixed fiield unit 7a, with two moving armatures 7b and 7c, and to provide the fixed field unit 7a with two annular poles 10 and 11 arranged on each side of a field coil 9 and next to each other around the axis of rotation of the clutch. In accordance wtih the form of embodiment shown in FIG. 2, the armature 7b is keyed on the driving shaft 1 by a splined fitting 12 locked in the engaged position by a washer 13 extending over the space between the said spline at the end of shaft 1, and clamped against the said shaft by a bolt 14 passing axially through the shaft. The armature 7b is centered in the casing 15 of the device by means of a ball-bearing 16 and it serves to center a shaft 17 by means of a needle-bearing 18a and a ball bearing 18b.

Opposite the annular poles 10 and 11 of the fixed field unit 7a, the armature 7b is provided with rings 20 and 21 of ferro-magnetic material, these two rings being separated from each other by a coupling ring 22 of non-magnetic material, located opposite the air-gap between the two poles 10 and 11.

The second armature 7c of ferro-magnetic material is located inside the rings 20 and 21.

The armature 7b constitutes a fluid-tight casing rotating round the armature 7c through the intermediary of fluid-tight bearings 23 and 24, respectively, inside the hub of the armature 7c and on a hollow shaft 25 rigidly fixed to the armature 7c and rotating in turn on the shaft 17.

This sealed casing contains ferro-magnetic powder. By virtue of the shape of the armature 7c which is outwardly-flared towards the periphery, and owing to the steel receiving sheets 26 and 27, fixed to the armature 7b and arranged in the form of annular dishes about the axis of rotation on each side of the armature 7c, and immediately opposite the peripheral edges of the latter armature, so as to form annular channels open towards the exterior, the ferro-magnetic powder is maintained or forced by gravity and by centrifugal force into the air-gap zone between the two armatures 7b and 7c.

The switch which controls the excitation of the powder clutch is preferably actuated in its turn by an impulse generator 28, 29, 30, one of the portions 29 of which (field and armature) is driven by the shaft 1, while the other portion 28–30 is fixed, so that this impulse generator, the construction of which may be effected in any manner and is known to those skilled in the art, supplies a frequency proportional to the speed of revolution of the shaft 1, a high-pass frequency filter F being interposed in the circuit through which the impulses pass, this high-pass filter having the effect of permitting the impulses to act on the switch 8 only when the shaft 1 rotates at a speed greater than a predetermined threshold speed. In consequence, the switch 8 is brought into one of its working positions (closing the circuit of source S on coil 9) for speeds of the shaft 1 which exceed the said threshold value, and is in its other position, corresponding to the absence of the control impulses, for all speeds of the shaft 1 below the said threshold value. The reverse action would of course be obtained if the filter were a low-pass filter instead of being a high-pass filter.

It will be seen that when the fixed field 7a of the powder clutch is excited, the magnetic flux between the poles 10 and 11 is completed through the magnetic masses of the armatures 7b and 7c, passing from the pole 10 through the ring 20, the armature 7c, the ring 21, to the pole 11, by passing round the non-magnetic ring 22 of the armature 7b. The magnetic field which results between the armature 7c and the rings 20 and 21 agglomerates the ferro-magnetic powder which thus locks together the two armatures 7b and 7c of the clutch so that they are fast together for rotation, whereas the air-gap existing between the poles 10 and 11 of the fixed field and the armature 7b remains continuously open and does not interfere with the rotation of the armature 7b.

As regards the gear changing mechanism 4, which should permit the intermediate or output shaft 6 to be driven by the driving or input shaft 1 according to two different gear ratios adapted to be put in operation respectively by the engagement or disengagement of the powder clutch, this can be arranged in various ways. In accordance with a further arrangement of the invention however, it is of particular advantage to provide the gear-changing mechanism on the one hand with three pinions 31, 32, 33 of different diameters and coaxially mounted with respect to each other and to the input and output shafts 1 and 6, two of these pinions co-operating with the shaft 1, one of the said pinions 31 through the intermediary of the hollow shaft 25 and the powder clutch 7, and the other pinion 33 is keyed on the driven shaft 6 and, on the other hand, three further pinions 31a, 32a, 33a, rigidly fixed together for rotation by mounting on a common hollow shaft 53a the said shaft being mounted on a fixed countershaft 35 about which the hollow shaft 35a rotates freely, each of the pinions 31a, 32a, 33a being in engagement with one of the pinions 31, 32, 33.

In an assembly of this kind, it is convenient to mount the coupling shaft 17 which carries the pinion 32 between the overhung extremities of the driving or input shaft 1 and the output shaft 6 of the gear-changing mechanism. This shaft 17 is supported on the one hand in armature 7b by means of a bearing 18 (FIG. 1) or two bearings 18a and 18b (FIG. 2) and on the other hand on the shaft 6 by means of a bearing 36.

When the powder clutch 7 is excited, for example when the driving shaft 1 rotates at a speed less than the pre-determined speed at which the excitation is cut-off by the switch 8, the rotational movement of the driving shaft 1 is transmitted through 7b, 7c, 25, 31, 31a, 33a, 33, to the shaft 6 with a relatively high step-up gearing ratio, the free-wheel 34 then running idle.

When, on the other hand, the shaft 1 rotates at a speed higher than that at which the switch 8 cuts-off the excitation current of the field unit 7a, which frees the armatures 7b and 7c from each other, the movement is transmitted from the driving shaft 1 to the shaft 6 through 34, 17, 32, 32a, 33a, 33 with a gearing ratio lower than that of the above case.

The variations in speed of the shaft 6 are thus brought within narrower limits that those of the driving shaft 1, which in the case of the shaft 5 being driven at a substantially constant speed less than that of the shaft 6, makes it possible to have only a relatively small amount of slip between the field 3a and the armature 3b of the eddy-current clutch 3.

In accordance with the arrangements provided by the invention therefore, irrespective of the form of construction adopted, there is obtained a coupling device having a large number of advantages, and in particular:

The construction is both simple and robust;

The inertia of the moving parts, both of the gear-changing mechanism and of the clutch which forms part of that mechanism, is reduced to the minimum;

In the clutch which forms part of the gear-changing mechanism, there are no coils in movement, and this eliminates the risk of damage due to centrifugal force.

The adjustment of the slip between the field 3a and the armature 3b of the eddy-current clutch 3 is obtained by the automatic adjustment of the excitation current of the field 3a.

This excitation is preferably controlled in two stages, one corresponding to a rough adjustment acting in dependence on the load of the alternator 2, and the other a fine adjustment acting as a function of the speed of the alternator shaft, that is to say of the frequency of the alternating current which it generates. The means for carrying out such control of the clutch excitation, which do not form part of the present invention, have already been described by the present applicant in Patent No. 1,146,185, filed in France on February 15, 1956.

It must be well understood that, in the construction of a powder clutch for use in a coupling device as above described, it is an essential requirement to prevent foreign substances, in particular oil, from entering the space inside the clutch element 7b forming an annular casing surrounding the other rotating element 7c. As a matter of fact the elements forming shaft 17, shaft 25, rotating clutch unit 7b, which rotate with respect to one another, must be very abundantly lubricated, especially in view of the very high speeds at which these elements must rotate (driving shaft 1 rotates at speeds ranging from 3000 to 8000 r.p.m.). On the other hand, the temperature at which the system is working is high (ranging from 125 to 150° C.). In these conditions, oil vapours are formed which would tend to penetrate into casing 7b and would clog the powder disposed in this element.

Figure 2:
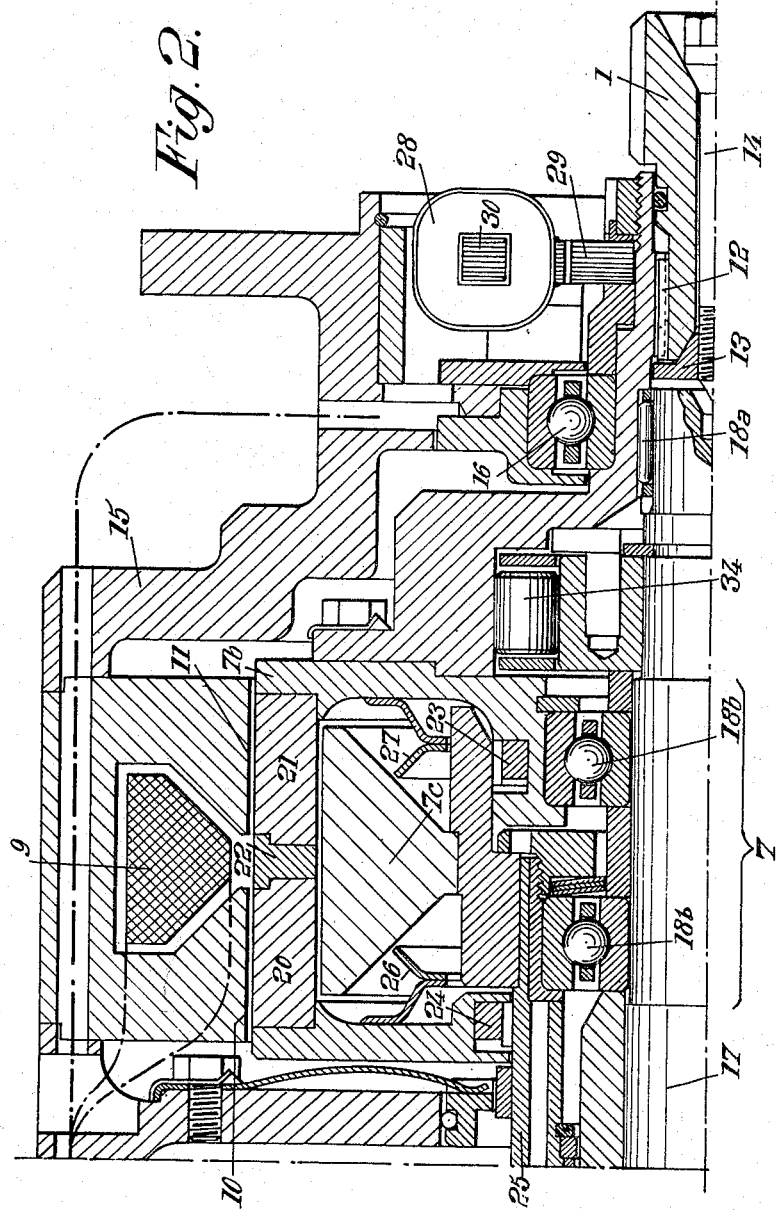
FIG. 2 shows an axial half-section of a preferred form of construction of a powder cluch for a set such as that shown in FIG. 1.

In the construction illustrated by FIG. 2, ingress of oil into the casing formed by clutch element 7b, and which contains the other rotating clutch element 7c, is prevented by provided fluidtight bearing 23 and 24 between said elements 7b, and 7c. FIG. 3 shows a different arrangement which has proved to be very efficient in practice.

The general construction of the powder clutch of FIG. 3 is similar to that of FIG. 2, but the side portions of element 7c are no longer connected in a permanent manner with corresponding portions of element 7b. Instead of this, element 7c is provided with outwardly extending flanges 41 and 42; the outer edge of flange element 41 is located in close proximity to a hole 43 extending through the side wall of element 7b.

On the other side of the clutch, flange element 42 is located on the outside of the casing formed by clutch element 7b. Furthermore, the inner edges 46a and 46b of the side walls of clutch element 7b, carry, fixed thereon, annular packing members 44a and 44b, respectively, made in a plastic resilient material such as rubber, néoprène, the materials designated by the trademark Viton and Teflon, "Viton" designating a copolymer of vinylidene fluoride and hexafluoropropylene, and "Teflon" designating tetrafluoroethylene. The inner edges of said packing members are applied, by metal rings 44a and 44b respectively, against the axial extensions 47 and 48 belonging to clutch unit 7b.

Metal rings 45a and 45b are determined so that when unit 7b is rotating at the speeds imparted thereto by shaft 1, the centrifugal force applied to packing members 44b and also to rings 45a and 45b cause them to expend so that the inner edges of members 44a and 44b are no longer in contact with the extensions 47 and 48 of clutch unit 7b.

The operation of this device is as follows:

When the clutch is at rest, rings 45a and 45b apply packing members 44a and 44b tightly against extension 47 and 48, respectively. It is thus impossible for various particles, in particular oil vapors, to penetrate into the casing formed by clutch unit 7b, whereby the powder present in said casing cannot be soiled. When the clutch elements are rotating, packing members 44a and 44b are expended as above explained, and the inner edges are no longer in contact with the extensions 47 and 48 of clutch element 7c, so that members 44a and 44b do not undergo any wear and tear. But at the same time flanges 41 and 42 carried by clutch element 7c and rotating at high speed, centrifugally project all the particles that might come into contact with their outer faces and thus prevent any ingress of oil through the space limited between said flanges 41, 42 and the outer walls of the casing formed by clutch unit 7b.

In the construction of FIG. 3, the annular cylindrical wall portions 20a and 20b of clutch unit 7b, instead of consisting of two elements such as 20 and 21 of FIG. 2, assembled together for instance by means of screws, belong to a single piece. The provision of a central non-magnetic ring between said portions 20a and 20b, is obtained in a particular manner.

I start from a cylindrical sleeve made of a single piece and, as illustrated by FIG. 4, a groove 50 is machined in the outer wall of said sleeve. Then said groove is filled with a metal ring fixed therein by welding as shown at 22a on FIG. 5. A groove 51 is now cut in the inner wall of the sleeve as also shown by FIG. 5, this groove being located opposite metal ring 22a.

Finally, this groove 51 is filled with a non-magnetic metal ring 22b, so that the two portions 22a and 22b form together the non-magnetic ring 22 of FIG. 3.

This method has the advantage that the two portions 20a and 20b of the peripheral wall of clutch unit 7b are accurately positioned with respect to each other since they initially belong to the same piece.

Another interesting feature of the construction shown by FIG. 3 relates to the lubrication of free wheel 34. For this purpose, shaft 17 is made hollow and the inner bore 52 of this shaft, which is fed with oil under pressure, communicates through a radial hole 53, provided therein, with the free wheel 34 to be lubricated.

It should be well understood that the present invention is not in any way limited to its methods of application or to the forms of embodiment of its various parts which have been more particularly described. On the contrary, the invention includes all the alternative forms of construction which fall within the scope of the appended claims.

This application is a continuation in part of my prior U.S. application Ser. No. 70,157, filed Nov. 18, 1960, for Rotary Device for Coupling, With Slip, a Variable Speed Driving Shaft to a Driven Shaft Having Substantially Constant Speed, now abandoned.

What I claim is:

1. A rotary coupling device comprising an induction clutch coupled between a driving shaft rotating at a variable speed and a driven shaft the speed of which is required to be maintained substantially constant; a gear-changing mechanism coupled between said induction clutch and said driving shaft, said mechanism having two different gear-ratios; alternatively-acting means provided in said mechanism for transmitting the driving torque from said driving shaft, said means comprising a free-wheel device and a magnetic powder clutch respectively, said powder clutch incorporating a magnetic field system fixed to the casing of said coupling device and two rotatable armatures co-operating with said field system and adapted to rotate either separately or as a unit at will with respect to said field system; and means for rendering said free-wheel device and said powder clutch alternatively operative in dependence on the speed of one of the rotating members of said device.

2. A rotary coupling device as claimed in claim 1, in which the operation of said powder clutch is automatically controlled in dependence on the speed of said driving shaft.

3. A rotary coupling device comprising an induction clutch coupled between a driving shaft rotating at a variable speed and a driven shaft the speed of which is required to be maintained substantially constant; a step-up gear-changing mechanism coupled between said driving shaft and said induction clutch, said mechanism having two different gear ratios; alternatively-acting means provided in said mechanism for transmitting the driving torque from said driving shaft, said means comprising a free-wheel device and a magnetic powder clutch respectively; said powder clutch being disposed between said driving shaft and said induction clutch and including a magnetic field system fixed to the casing of said coupling device and two rotatable armatures co-operating with said field system and adapted to rotate either separately or as a unit with respect to said field system; and means for rendering said free-wheel device and said powder clutch alternatively operative.

4. A rotary coupling device comprising an induction clutch coupled between a driving shaft rotating at a variable speed and a driven shaft the speed of which is required to be maintained substantially constant; a gear-changing mechanism coupled between said induction clutch and said driving shaft, said mechanism having two different gear ratios; alternatively-acting means provided in said mechanism for transmitting the driving torque from said driving shaft, said means comprising a free-wheel device and a magnetic powder clutch respectively, said powder clutch incorporating a magnetic field system fixed to the casing of said coupling device, two annular poles and two rotatable armatures co-operating with said field system and adapted to rotate either individually or as a combined unit with respect to and under the control of said field system, one of said armatures constituting a closed rotatable casing enclosing the other said armature and having at its periphery two coaxial rings of ferromagnetic material separated from each other by a non-magnetic ring, whereby each said magnetic ring can rotate in continuous juxtaposition with one of said annular poles of the fixed field system.

5. A rotary coupling device as claimed in claim 4, in which said second-mentioned rotatable armature enclosed in said rotatable casing has a section outwardly flared from its axial portion to its periphery, and said first-mentioned hollow armature is provided with annular channels having their openings facing outwards and disposed inside said rotatable casing directly below the lateral peripheral edges of said second-mentioned armature.

6. A rotary coupling device as claimed in claim 1, in which said free-wheel device is mounted in the hub portion of one of said rotatable armatures of said powder clutch.

7. A rotary coupling device comprising an induction clutch coupled between a driving shaft rotating at a variable speed and a driven shaft the speed of which is required to be maintained substantially constant; a two-ratio gear-changing mechanism coupled between said induction clutch and said driving shaft, said mechanism comprising: three pinions of different diameter, coaxial with each other and with said driving and driven shafts, two of said pinions co-operating with one of said shafts respectively through a magnetic powder clutch having a fixed magnetic field system and two rotatable armatures and controlled by a device automatically responsive to the speed of rotation of said driving shaft, and through a free-wheel device, the third said pinion being fixed on the other said shaft; and three further pinions fixed together for rotation and rotatably mounted on a fixed-countershaft, each of said last-mentioned pinions being in engagement with one of said first-mentioned pinions.

8. A rotary coupling device as claimed in claim 7, in which said device automatically responsive to the speed of said driving shaft is an automatic switch adapted to control the excitation current of the fixed field system of said powder clutch.

9. A rotary coupling device as claimed in claim 7, in which the coupling of said free-wheel device to the pinions of said gear-changing mechanism is effected by means of an intermediate shaft rotatably mounted on the adjacent extremities of said driving and driven shafts aligned with said gear-changing mechanism, a hollow shaft rotatably mounted on said extremities and coupling the inner armature of said powder clutch to one of the pinions of said gear-changing mechanism.

10. A rotary coupling device according to claim 9 wherein said intermediate shaft is hollow and fed with oil under pressure, and radial conduit means starting from the inside of said intermediate shaft and leading to said free-wheel to supply oil directly from said intermediate shaft to said free-wheel.

References Cited by the Examiner

UNITED STATES PATENTS

| | | | |
|---|---|---|---|
| 1,775,981 | 9/30 | Warner | 29—155.59 |
| 2,120,352 | 6/38 | Ericson | 310—99 |
| 2,211,377 | 8/40 | Langgasser | 310—99 |
| 2,534,134 | 12/50 | Kirkpatrick | 74—368 X |
| 2,860,403 | 11/58 | Meyer | 29—155.59 |
| 2,883,611 | 4/59 | Fuge | 322—40 |
| 2,885,045 | 5/59 | Barrett | 192—21.5 |
| 2,897,931 | 8/59 | Didszuns | 192—21.5 |
| 2,927,472 | 3/60 | Grant | 74—365 X |
| 2,995,950 | 8/61 | Peras | 74—368 |

MILTON O. HIRSHFIELD, *Primary Examiner.*

DAVID X. SLINEY, *Examiner.*